Aug. 10, 1965   N. LOWE ETAL   3,199,515
APPARATUS FOR MAKING SMOKING ARTICLES
Filed Nov. 26, 1962   11 Sheets-Sheet 1

INVENTORS
NICHOLAS LOWE
& FRANK T. BARTOLOMEO, deceased
BY JULIA A. BARTOLOMEO, Executrix BY *Shoemaker and Mattare*

ATTORNEYS

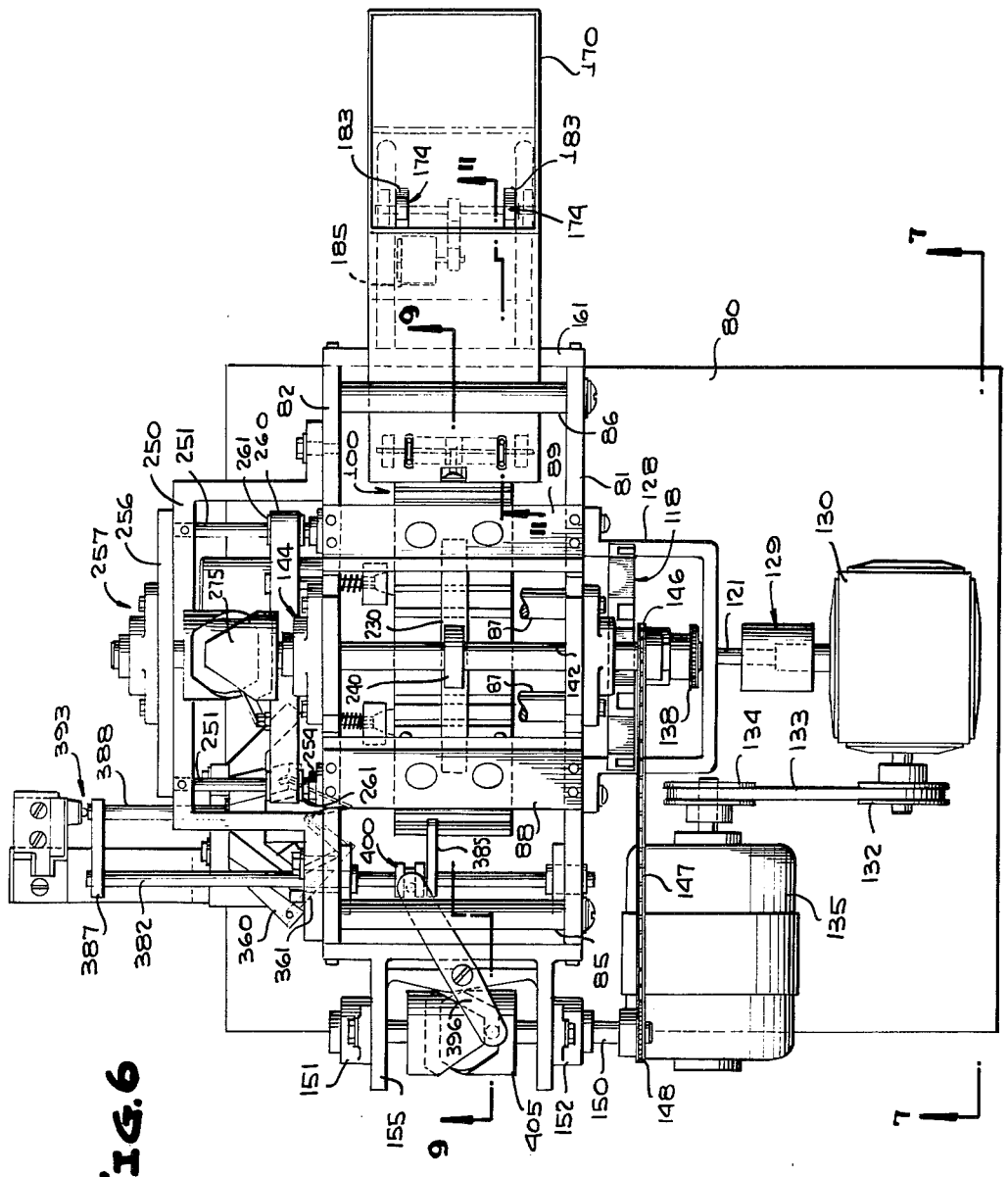

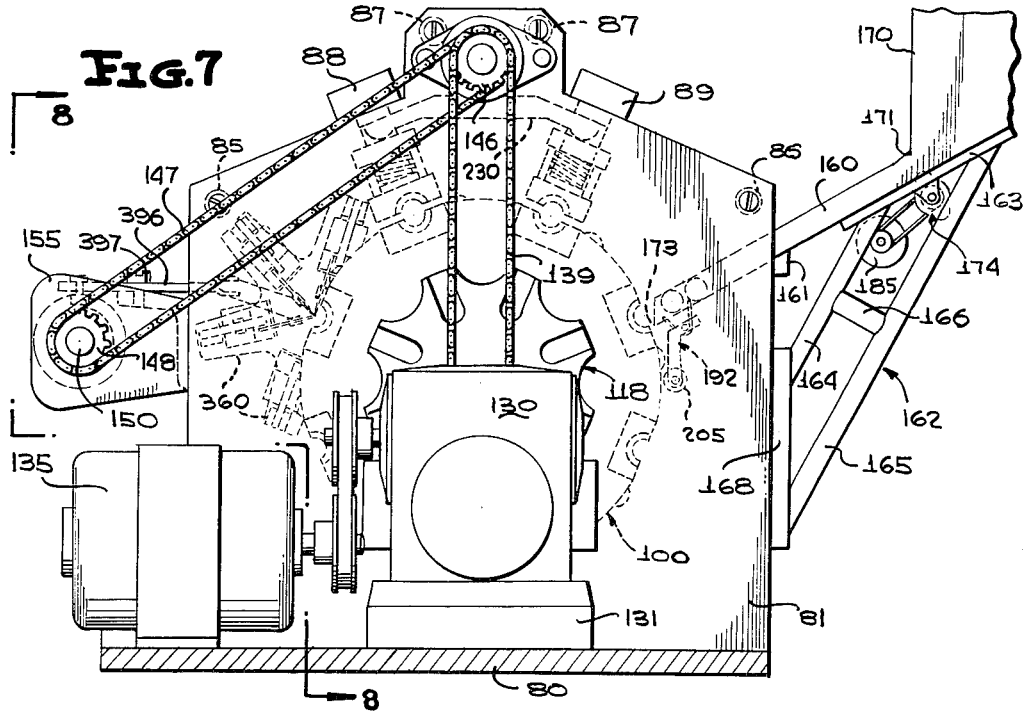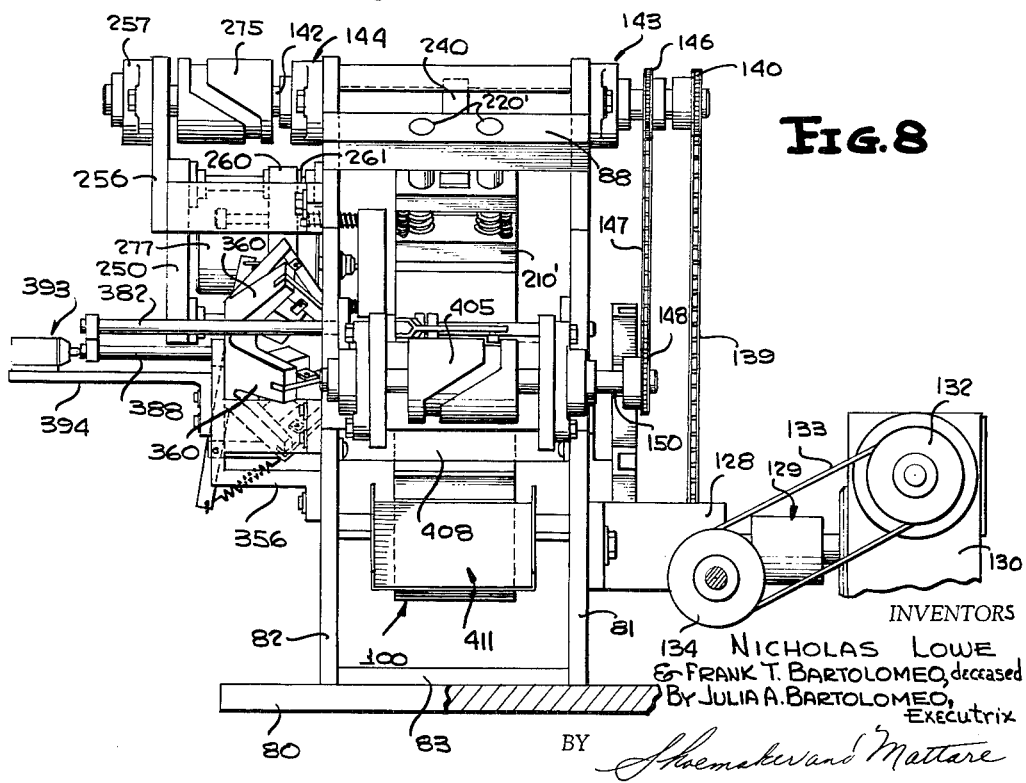

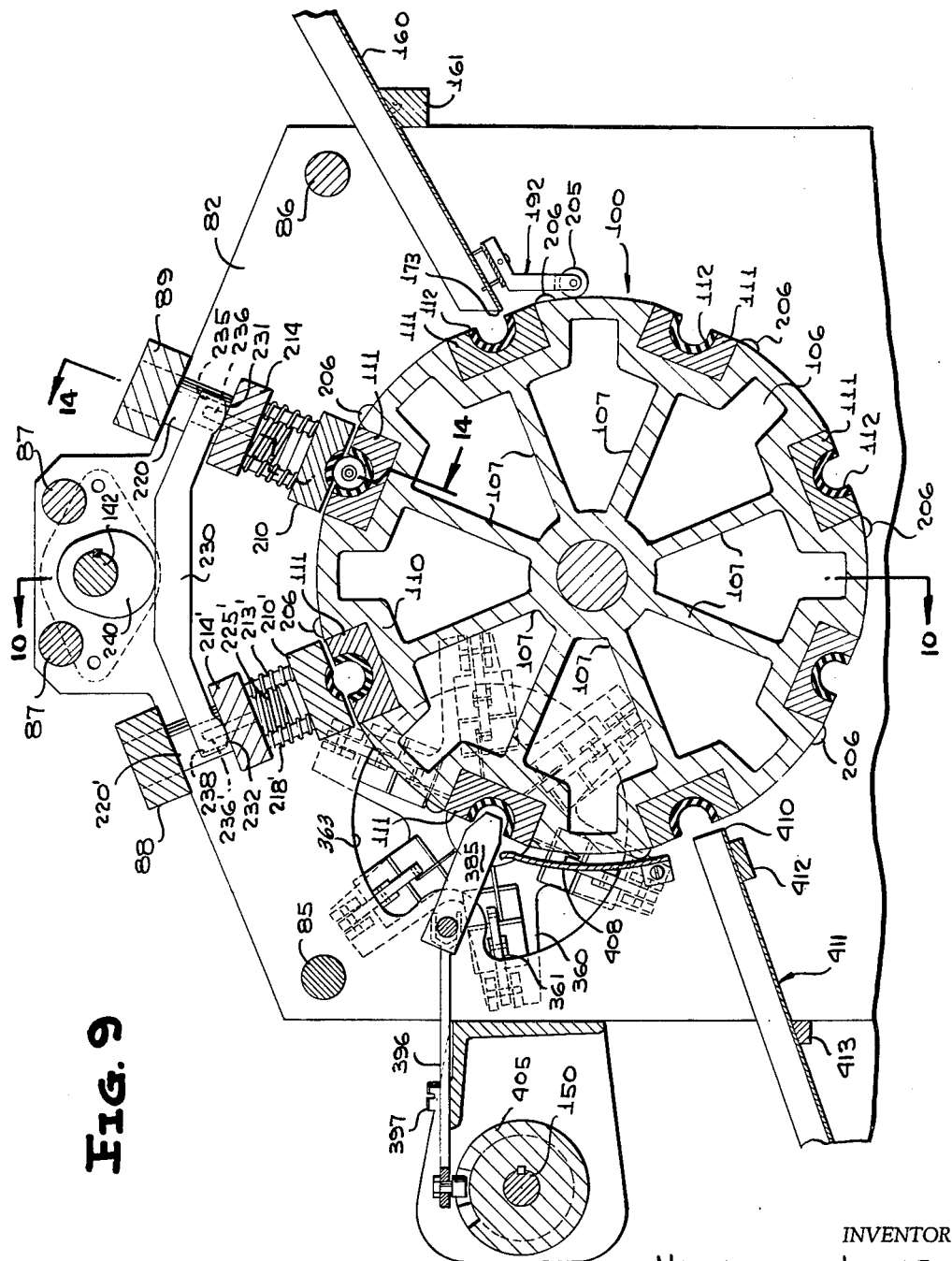

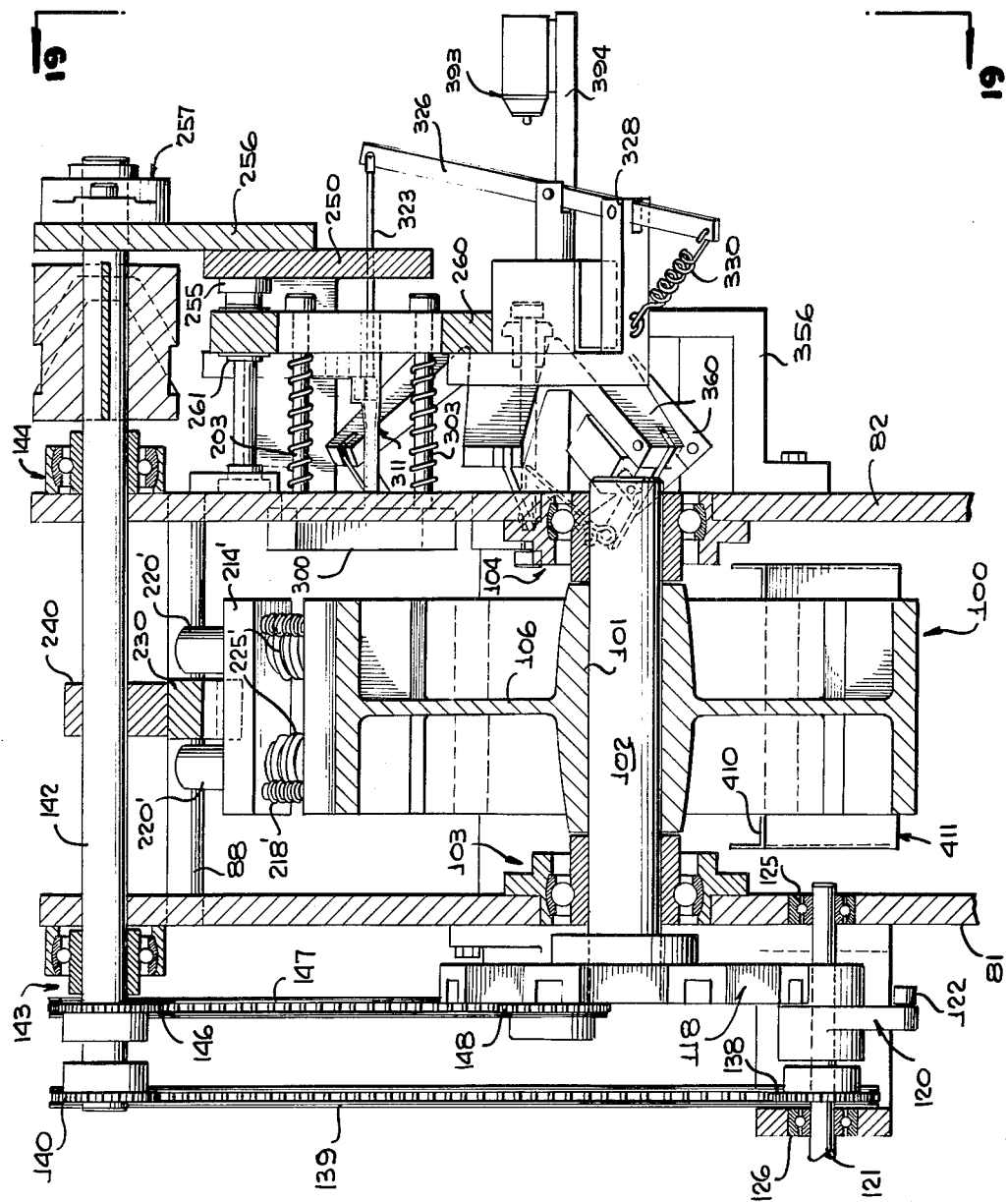

Aug. 10, 1965   N. LOWE ETAL   3,199,515
APPARATUS FOR MAKING SMOKING ARTICLES
Filed Nov. 26, 1962   11 Sheets-Sheet 6
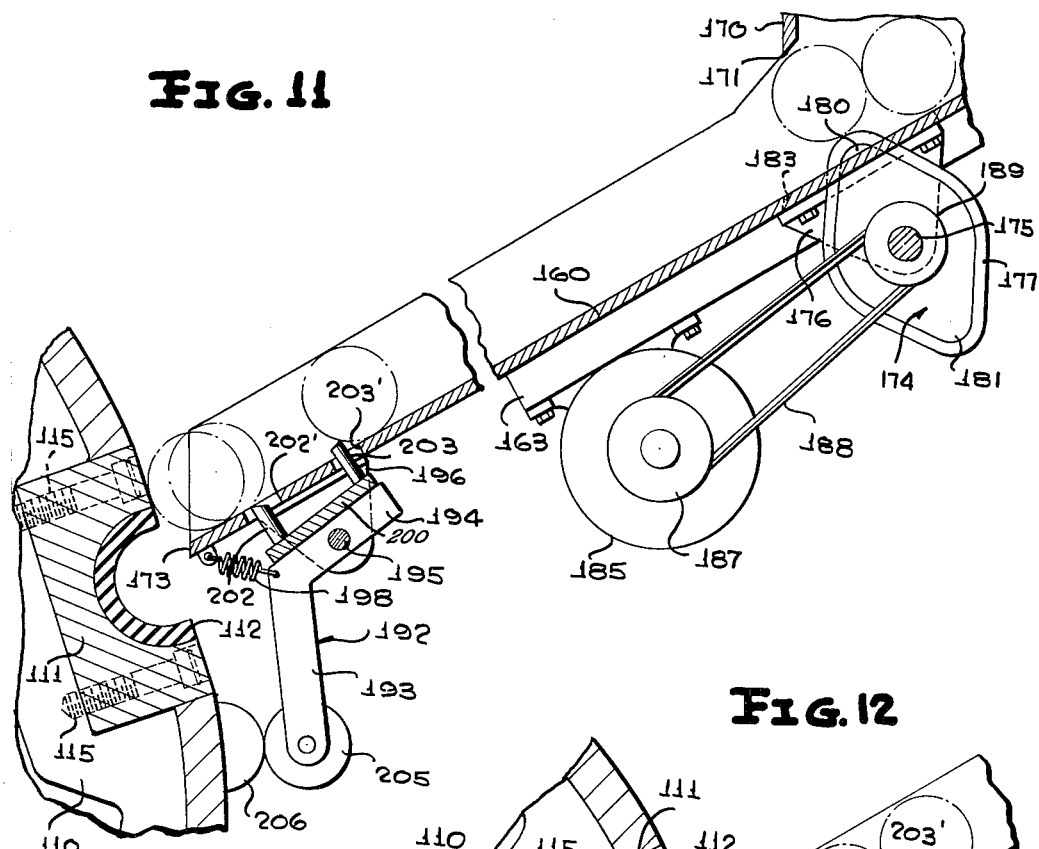
FIG. 11
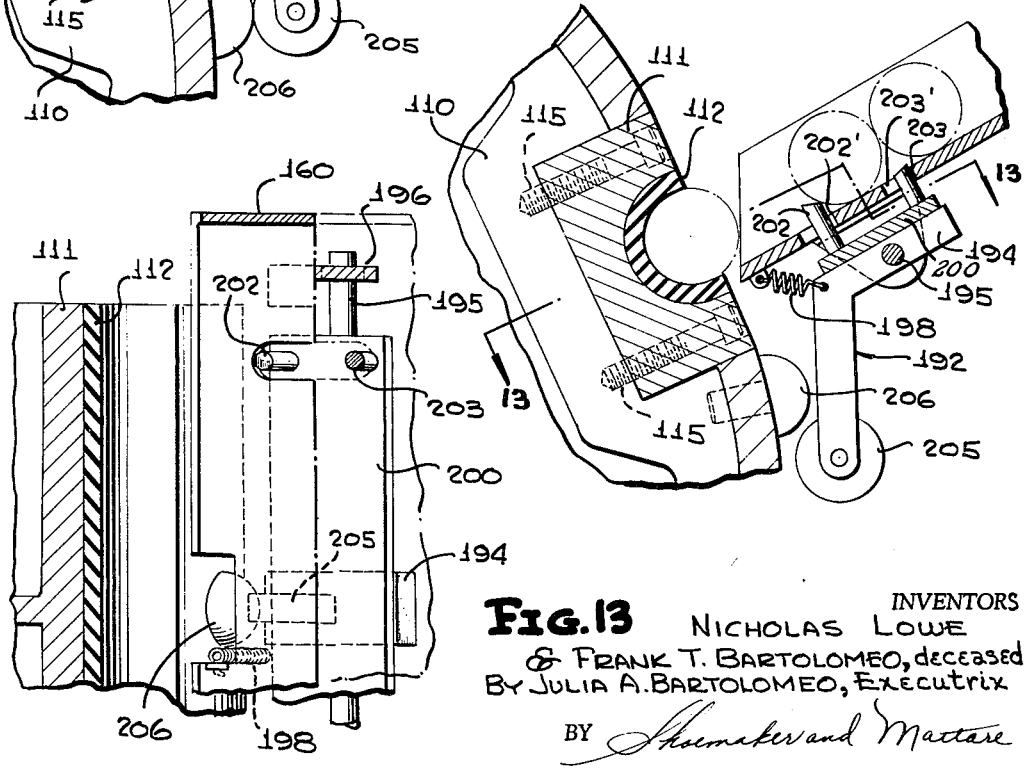
FIG. 12
FIG. 13
INVENTORS
NICHOLAS LOWE
& FRANK T. BARTOLOMEO, deceased
BY JULIA A. BARTOLOMEO, Executrix
BY Shoemaker and Mattare
ATTORNEYS

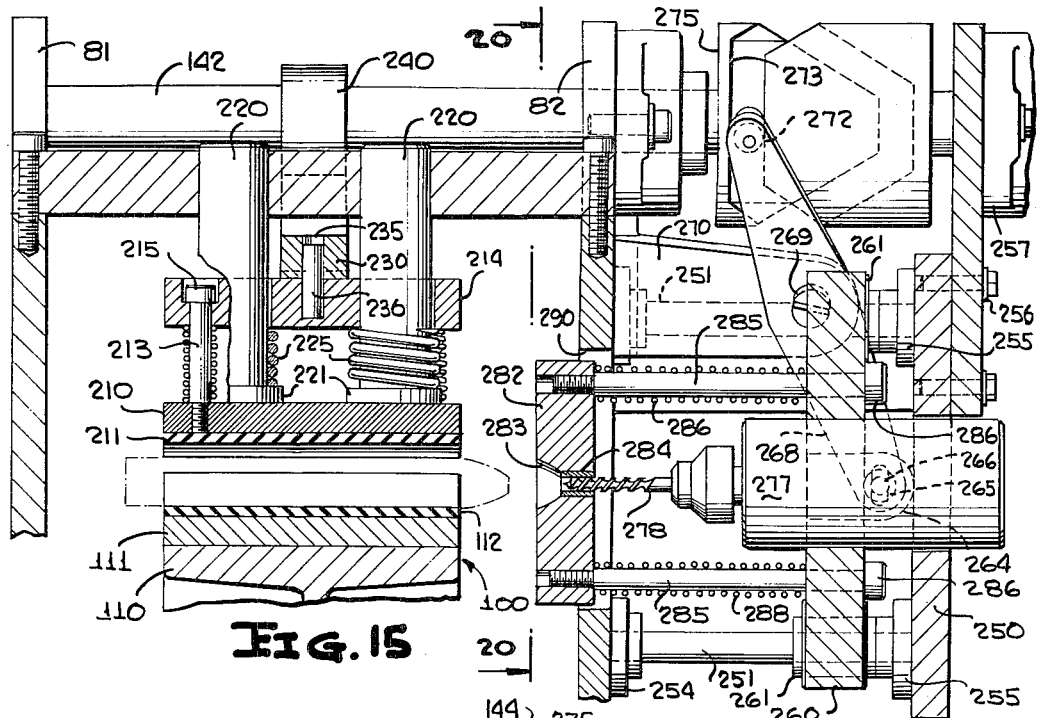
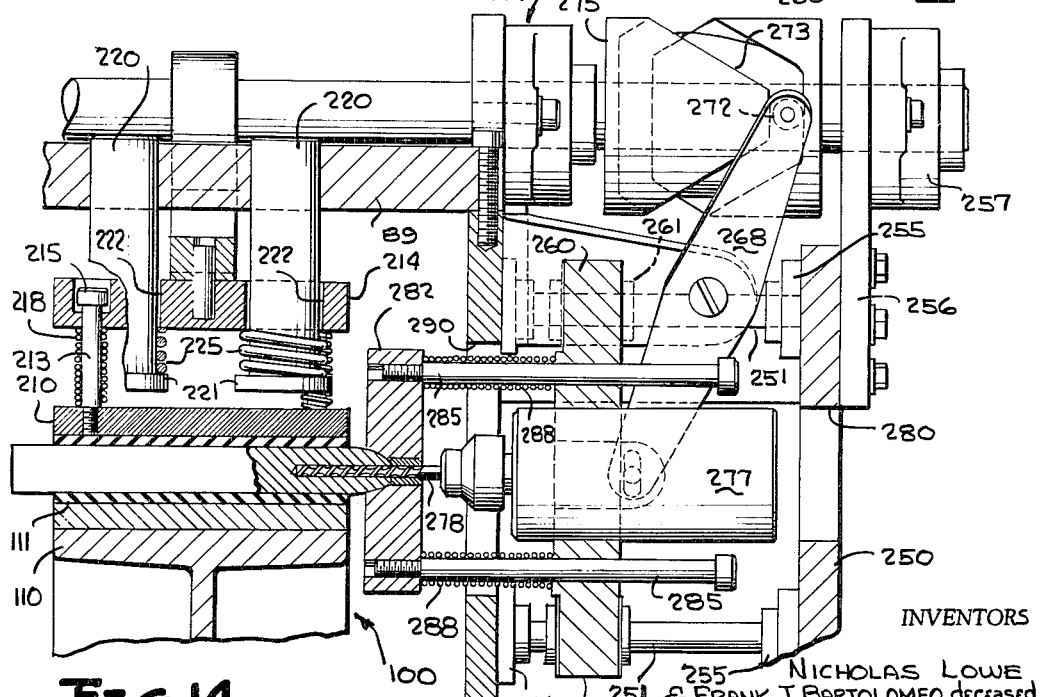

Aug. 10, 1965    N. LOWE ETAL    3,199,515
APPARATUS FOR MAKING SMOKING ARTICLES
Filed Nov. 26, 1962    11 Sheets-Sheet 8
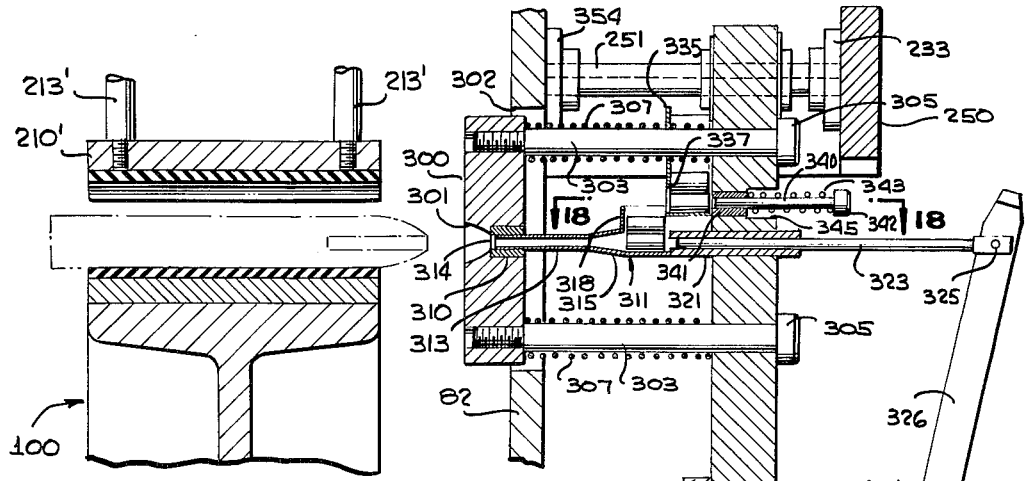
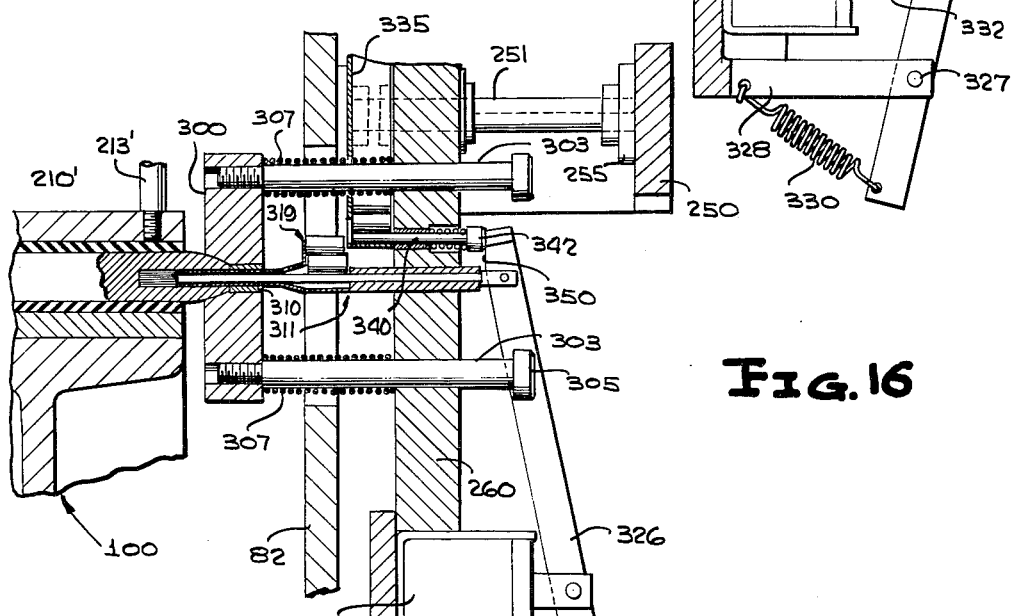
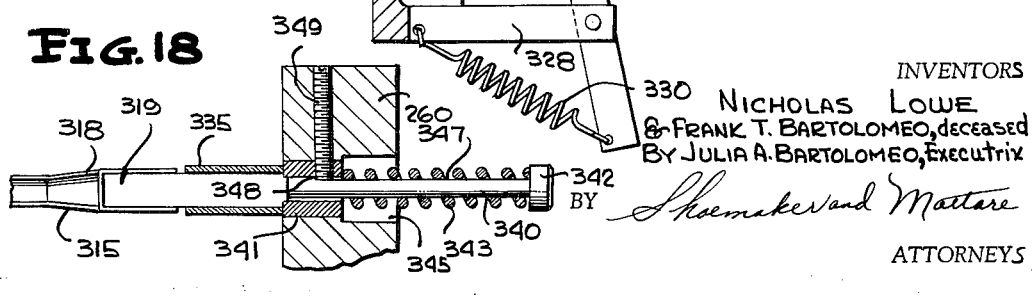
INVENTORS
NICHOLAS LOWE
& FRANK T. BARTOLOMEO, deceased
BY JULIA A. BARTOLOMEO, Executrix
BY Shoemaker and Mattare
ATTORNEYS

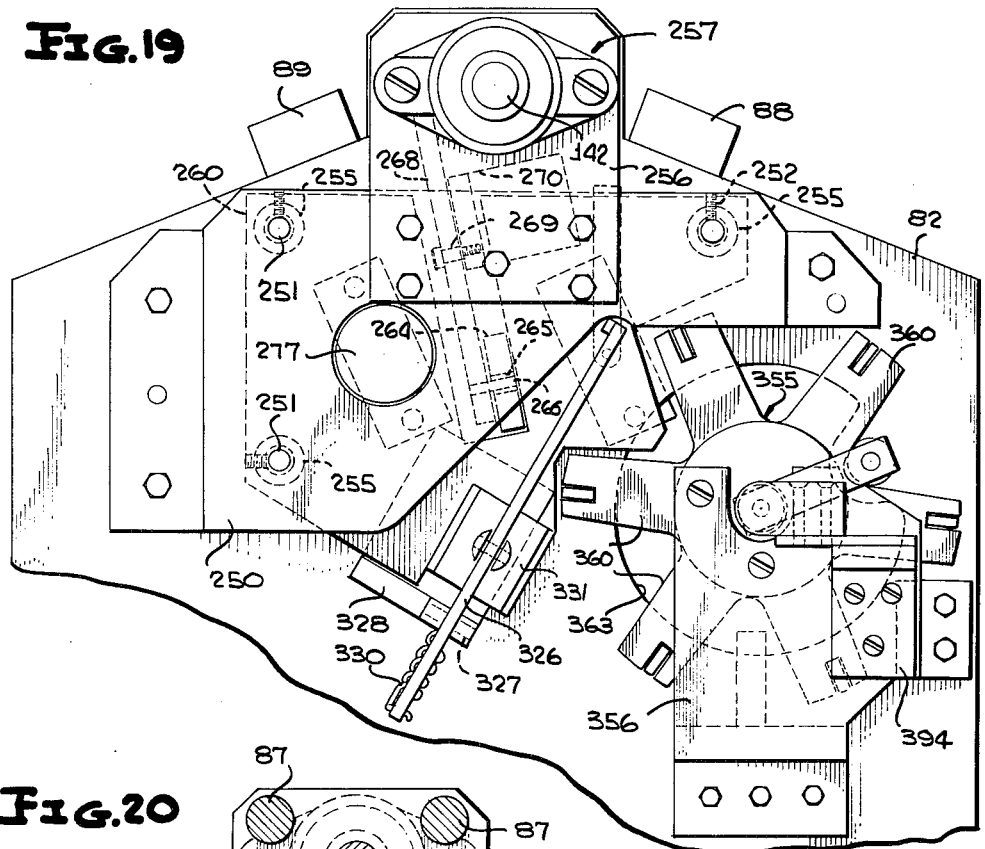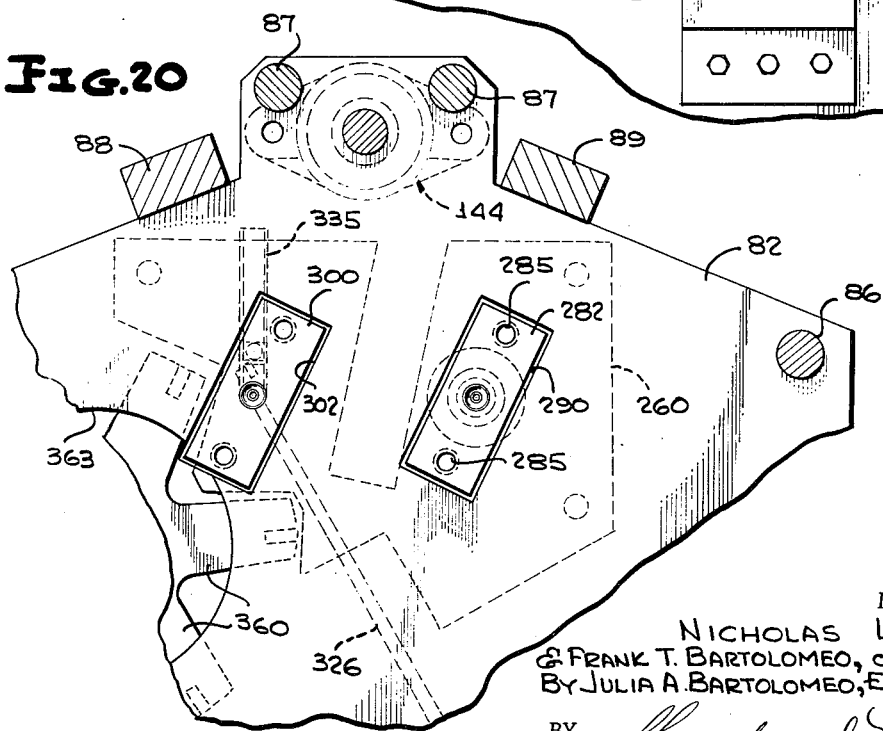

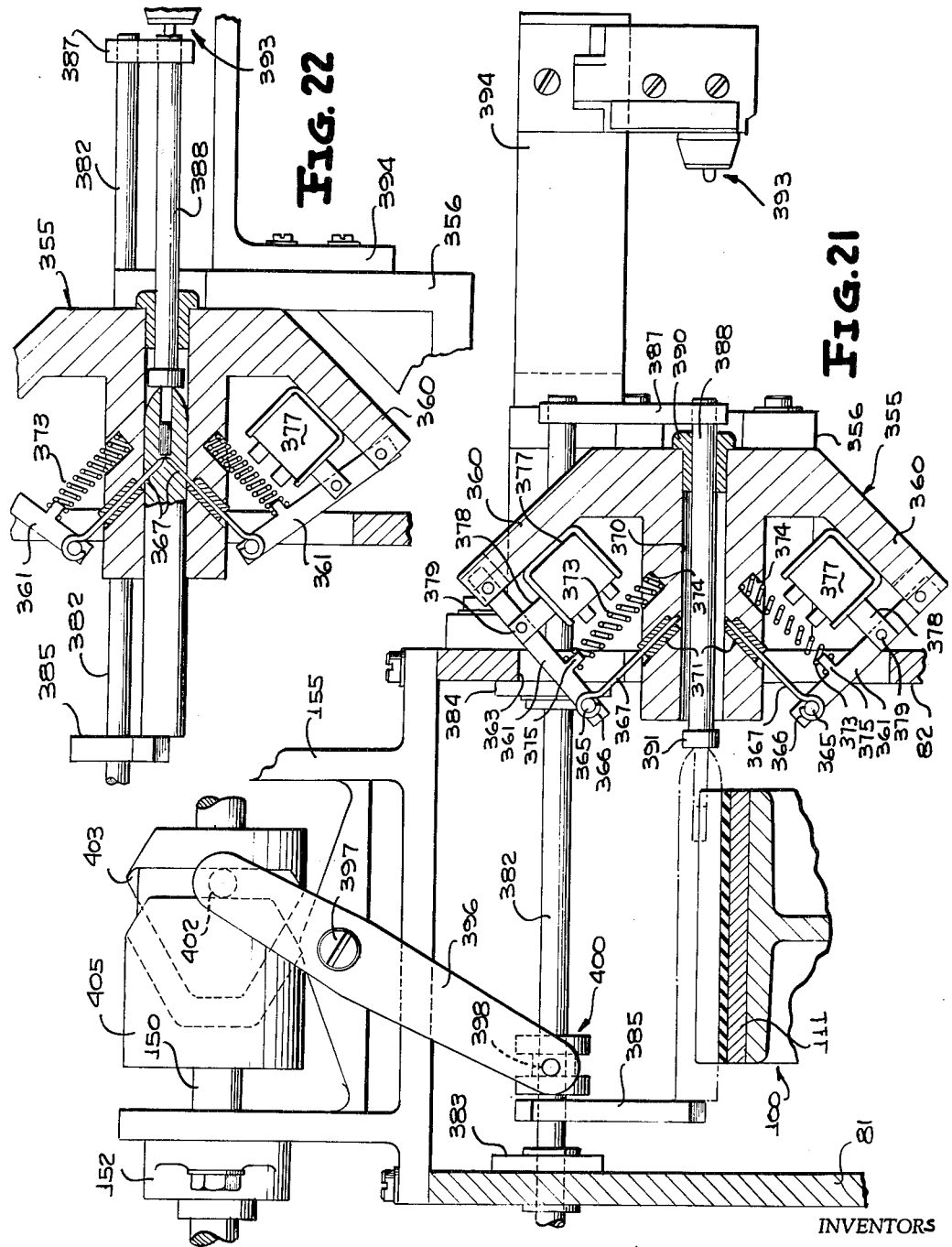

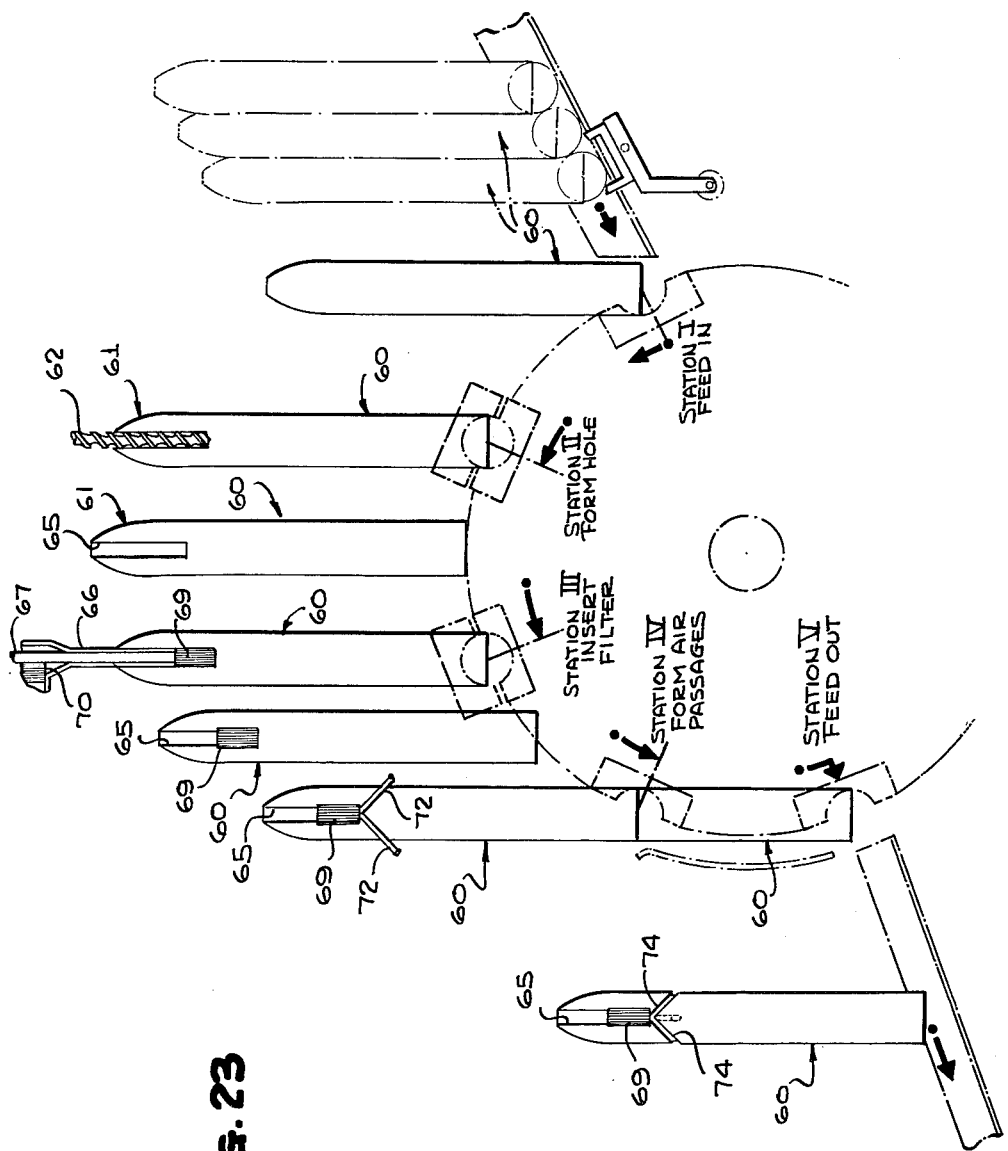

3,199,515
APPARATUS FOR MAKING SMOKING ARTICLES
Nicholas Lowe, Bayside, N.Y., and Frank T. Bartolomeo,
deceased, late of Merrick, N.Y., by Julia A. Bartolomeo,
executrix, Merrick, N.Y.
Filed Nov. 26, 1962, Ser. No. 240,175
9 Claims. (Cl. 131—94)

The present invention relates to a new and novel apparatus for making smoking articles, and more particularly to improvements in the manufacture of articles such as cigars, cigarettes cheroots and like smoking articles wherein tobacco is retained within a suitable wrapper formed of paper, tobacco leaf or like material. The present invention is particularly concerned with performing operations on smoking articles which have already been manufactured in the conventional finished form, the present invention modifying the finished form of the smoking article to provide a new and improved smoking article which substantially enhances the smoking qualities as well as improving the smoking article from a health standpoint.

In recent years, extensive experimentation has established that certain diseases appear to have a connection with smoking, and it is generally conceded that harmful results occur to the human antomy as a result of smoking due to the various tars and resins which are introduced into the smoker's body as a result of inhaling the smoke since such harmful substance may be absorbed within the lungs or the tissues of the oral cavity. In an effort to alleviate the harmful results as discussed above, it has been a common practice to place filter means in the butt end of cigarettes for example. A particular disadvantage of the filter arrangements as employed at present is the fact that the entire supply of smoke passes through the filter means, and many smokers feel that the flavor of such completely filtered smoke is not as desirable as is the case with a smoking article not employing such a filter means.

It is accordingly a purpose of the present invention to provide apparatus for forming a smoking article wherein the filter means is disposed in the butt portion of the smoking article and is spaced both from the wrapper and from the butt end face of the article and is completely surrounded by the combustible material of the smoking article. In this manner, the smoke and air drawn into the smoker's mouth through the butt end of the cigarette will pass partly through the filter means and partly through the filler tobacco surrounding the filter such that the filtered and unfiltered smoke will blend together in the smoker's mouth to provide substantially the same pleasant taste as is obtained with completely unfiltered smoke while at the same time a major portion of the tars and resins will be filtered out by the filter means.

A particular advantage of the present invention is the fact that the smoking article, be it a cigar, cigarette, cheroot or the like, may be manufactured in exactly the same manner as has been the prior art practice, the smoking article then being treated by the apparatus as disclosed herein, so as to provide a new and improved finished smoking article. The filter means as employed with smoking articles according to the present invention may be constructed of extremely inexpensive and readily available materials since the filter means is not engaged by the smoker's mouth, and furthermore, the filter means may obviously be much smaller than those employed for a similar purpose.

It is an additional feature of the present invention to provide the smoking article with a recess in the end of the smoking article, the filter means being seated in the innermost portion of this recess while an unobstructed portion of the recess is disposed immediately adjacent the butt end face of the smoking article. This free recess at the butt end of the smoking article provides a small chamber wherein mixing and cooling may take place to further enhance the smoking pleasure obtained with the article.

An additional feature of the present invention is to provide in a smoking article air passage means having the outer end opening through the outer surface of the smoking article and the inner end disposed adjacent the central portion of the article. This passage means extends obliquely to the longitudinal axis of the article and is adapted to entrain cooling air within the central portion thereof.

The provision of the recess, the filter means in the central portion of the smoking article, and the obliquely extending passage means each in themselves provide beneficial results, and in combination with one another serve to further improve the taste and quality of the smoke.

A number of different combinations of these features are possible, and it is noted that either the recess or the air passages may be used individually, or the recess may be utilized in combination with the air passages or the filter, and furthermore, the recess, the air passages, or the filter may all be utilized in combination with one another.

The provision of the obliquely extending air passage means at the central portion of the smoking article causes condensation and depositing of the tars and resins at the central portion of the smoking article, and when the air passage means terminates adjacent the filter means, the condensation and depositing of the tars and resins within the filter means is promoted, and the smoke is cooled such that it provides a cooler smoke for the smoker.

The passage means preferably takes the form of a plurality of passages, the inner ends of which are disposed closely adjacent to one another and preferably intersect one another to thereby direct the air inwardly to a common point within the smoking article.

The apparatus of the present invention may be operated completely automatically.

Firstly, a recess is bored in the end of the smoking article, and the formation of such a recess may be most readily performed with cigars, and accordingly, the invention as disclosed herein is described in connection with a cigar, although it should be understood that the invention could also be employed with other similar smoking articles as discussed above.

After boring the recess in the end of the smoking article, the filter means is inserted in the inner end of this recess, and the filter is first compressed and then allowed to expand within the recess so that it will be snugly received therein and retained in operative position.

The smoking article is then provided with the obliquely extending passage means by piercing means which is adapted to pierce the wrapper of the smoking article and pass inwardly so as to form such passage means permanently within the filler of the smoking article. The piercing means is then withdrawn and the passages will remain in the article.

A particularly advantageous feature of the apparatus is the fact that different combinations of the desired features in the smoking article may be readily obtained by modifying the steps of the method and by eliminating the operation at certain stations in the apparatus if desired. In this manner maximum versatility and variety is obtainable according to the invention.

The apparatus as disclosed herein employs an article transfer means which indexes the articles from station to station whereat different functions are performed. The apparatus is adapted to be operated continuously and automatically, and smoking articles will automatically be fed one by one onto the article transfer means by a novel feed mechanism.

Clamping means and article end holding means are provided at the recess forming station and the filter inserting station for holding the smoking articles in proper operative position and to ensure that they are not damaged when this operation is carried out.

The recess forming means as well as the filter inserting means are preferably carried on a common carriage which is automatically reciprocated toward and away from the smoking articles, in timed relationship to the indexing of the article transfer means.

The filter inserting means employs a novel means of feeding the individual filters successively into operative position and further employs a novel arrangement for compressing the filters, inserting the filters in operative position, and then allowing the filters to expand into their final position within a smoking article in the desired manner.

Novel means is also incorporated in the apparatus for forming the obliquely extending air passages in the smoking articles, and shifting means is provided for shifting the smoking articles from the article transfer means into the air passage forming means, and thence back again once more to the article transfer means from where it is transferred to an outlet chute. As mentioned previously, various portions of the apparatus may be rendered inoperative as selected so as to eliminate one or more of the operations to be performed on a smoking article.

An object of the present invention is to provide a new and novel apparatus for performing various operations on a smoking article, such operations being performed either separately or in various combinations with one another.

Another object of the invention is the provision of apparatus incorporating novel means for forming a recess in the butt end of a smoking article.

A further object of the invention is to provide apparatus for inserting a filter in a recess formed in the butt end of a smoking article.

A still further object of the invention is the provision of apparatus for forming obliquely extending air passage means in a smoking article.

Yet another object of the invention is to provide apparatus for making smoking articles which is simple, inexpensive, and compact in construction, and yet which is efficient and reliable in operation.

Other objects and many attendant advantages of the invention will become more apparent when considered in connection with the specification and accompanying drawings, wherein:

FIG. 6 is a top view of the apparatus according to the present invention;

FIG. 7 is a sectional view taken substantially along line 7—7 of FIG. 6 looking in the direction of the arrows;

FIG. 8 is a view partly in section taken substantially along line 8—8 of FIG. 7 looking in the direction of the arrows;

FIG. 9 is a sectional view taken substantially along line 9—9 of FIG. 6 looking in the direction of the arrows;

FIG. 10 is a sectional view taken substantially along line 10—10 of FIG. 9 looking in the direction of the arrows;

FIG. 11 is an enlarged view illustrating the feed mechanism of the present invention taken substantially along line 11—11 of FIG. 6 looking in the direction of the arrows;

FIG. 12 is a view showing a portion of the feed mechanism in a different position from that shown in FIG. 11;

FIG. 13 is a sectional view taken substantially along line 13—13 of FIG. 12 looking in the direction of the arrows;

FIG. 14 is a sectional view taken substantially along line 14—14 of FIG. 9 looking in the direction of the arrows;

FIG. 15 is a view similar to FIG. 14 showing the components in a different operative position;

FIG. 16 is a sectional view illustrating the filter inserting mechanism;

FIG. 17 is a view similar to FIG. 16 showing the components in a different operative position;

FIG. 18 is a sectional view taken substantially along line 18—18 of FIG. 17 looking in the direction of the arrows;

FIG. 19 is a view taken along line 19—19 of FIG. 10 looking in the direction of the arrows;

FIG. 20 is a view partially in section taken substantially along line 20—20 of FIG. 15 looking in the direction of the arrows;

FIG. 21 is a sectional view through the air passage forming means and the smoking article shifting means;

FIG. 22 is a view of a portion of the structure of FIG. 21 showing the components in different operative relationship to one another; and FIG. 23 is a schematic illustration of the steps performed in the method according to the present invention.

Figure 1:
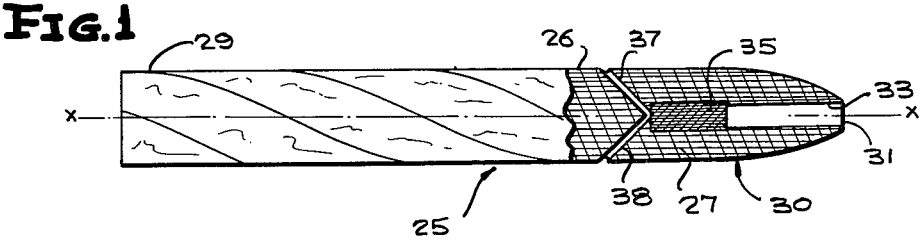
FIGS. 1–5 are views of smoking articles partially broken away illustrating various modifications of the smoking articles incorporating different features according to the present invention.

Referring now to the drawings wherein like reference characters designate corresponding parts throughout the several views, there is shown in FIG. 1 a smoking article made according to the present invention which is shown for the purpose of illustration in the form of a cigar indicated generally by reference numeral 25, the cigar including a wrapper 26 which in this case may be leaf tobacco within which is disposed a combustible material 27 formed of conventional cigar filler tobacco.

The smoking article includes an outer end 29 which is adapted to be lit, and a butt end portion indicated generally by reference numeral 30 which is adapted to be placed at least partially within a smoker's mouth, this butt end portion including a butt end face 31.

A substantially cylindrical recess 33 is provided in the butt end portion of the smoking article, the recess opening through the butt end face 31 and extending centrally substantially along the longitudinal axis $x$—$x$ of the smoking article.

A filter means indicated by reference numeral 35 may be of any conventional construction and preferably employs an absorbent material for absorbing tars and resins which may be deposited within the filter. It will be noted that the filter is disposed at the innermost portion of the recess 33 and is spaced a substantial distance from the butt end face 31 as well as the surrounding wrapper of the smoking article.

Air passage means is provided for entraining cooling air into the central portion of the smoking article and in this modification the air passage means may include a plurality of passages, two of which are shown in FIG. 1 and are indicated by reference numerals 37 and 38. In the example of the present invention the smoking article is provided with 6 equally spaced air passages, although the number of the air passages may be varied as desired.

It will be noted that air passages 37 and 38 open through the outer surface of the body of the smoking article and extend inwardly obliquely to the longitudinal axis of the smoking article and toward the butt end of the smoking article.

The air passages perferably intersect at their inner ends closely adjacent to the forward end of the filter means so as to produce a maximum cooling effect in this area thereby promoting deposition of tars and resins within the filter.

Figure 2:
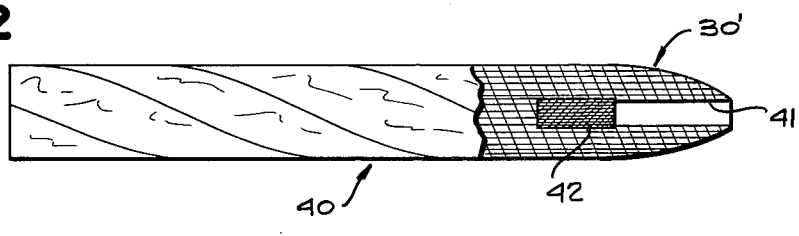

FIG. 2 illustrates a modified form of the smoking article as indicated by reference numeral 40, the smoking article in this instance being provided with a longitudinally extending recess 41 having a filter 42 disposed at the innermost end thereof. It will be noted that this modification is similar to that shown in FIG. 1 with the exception that the air passages have been eliminated.

Figure 3:
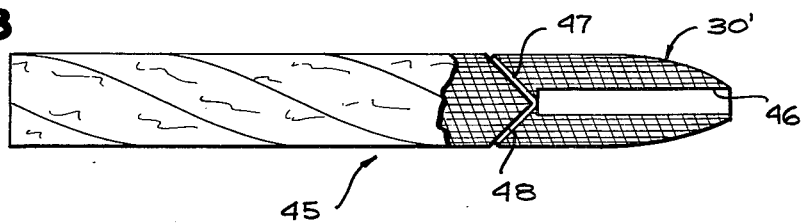

FIG. 3 illustrates a further modified form of the smoking article as indicated by reference numeral 45 wherein the smoking article is provided with a longitudinally extending recess 46, a plurality of air passages being provided as in the modification shown in FIG. 1, two of these air passages being indicated by reference numerals 47 and 48 in this figure. It will be seen that this modification is similar to that shown in FIG. 1 with the exception that the filter has been eliminated in this form of the smoking article.

Figure 4:
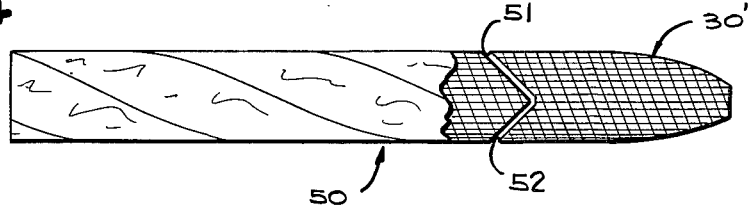

FIG. 4 illustrates a further modification wherein the smoking article is indicated generally by reference numeral 50, the article being provided with inwardly extending air passages as discussed in connection with FIG. 1, two of these air passags being indicated by reference numerals 51 and 52.

Figure 5:
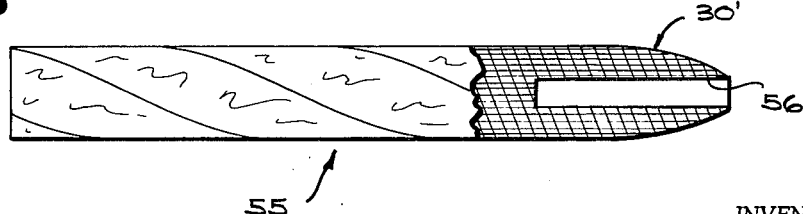

A still further modified form of the invention is illustrated in FIG. 5 of the invention wherein the smoking article is indicated generally by reference numeral 55 and is provided with a longitudinally extending recess 56. It will be noted that in each of the modifications shown in FIGS. 2–5 of the drawings, the butt end portions are indicated by reference numerals 30', and the air passage means, the filter means, and the recess in each instance is disposed within and adjacent to the butt end portion of the smoking article.

It is considered that the modification shown in FIG. 1 is preferable since it incorporates a unique combination of features which cooperate to provide a more pleasant and cooler smoke. On the other hand, it is evident that the different features may be combined as shown in FIGS. 2 and 3 or single features may be employed as shown in FIGS. 4 and 5, the smoking article in each case providing improved results as compared to a conventional smoking article such as a cigar.

Referring now to FIG. 23, the method according to the present invention may be more clearly understood wherein stations I–V are identified which roughly correspond to the stations I–V of the apparatus hereinafter described. In describing the method of the present invention, it is assumed that cigars are utilized in their conventional finished form and that these cigars are further processed in order to make the finished smoking article.

The smoking article is first provided or fed in at station I, this station corresponding to the feed-in station of the apparatus. The article is indicated generally be reference numeral 60 throughout FIG. 23. At station II, a recess is formed in the butt end portion 61 of the smoking article, and this recess is illustrated schematically as being bored in the butt end of the smoking article by means of a drill bit 62.

It will be recognized that although this recess is preferably formed by drilling and boring, it may also be formed by any suitable cutting mechanism which is adapted to remove the desired amount of material from the butt end of the smoking article. It is also apparent that this recess may be formed either automatically in the apparatus hereinafter described, or may as well be formed by manually manipulating a suitable cutting member.

In intermediate stations II and III, the smoking article is illustrated as having the cylindrical longitudinally extending recess 65 formed at the butt end portion 61 thereof. In station III suitable tubular means such as a hollow funnel 66 is inserted in the preformed recess in the butt end of the smoking article, and a plunger 67 which is longitudinally reciprocable within the funnel means is provided for forcing a filter indicated by reference numeral 69 into the innermost portion of the recess. At this point, a novel feature of the present invention should be carefully noted. The outer dimension of the funnel means is such that it is adapted to fit within the recess in the smoking article and the filters employed in the present invention are provided with an outside diameter which is greater than the inside diameter of the recess.

It will be noted that the funnel means 66 is provided with an intermediate portion 70 which tapers inwardly toward the open outer end of the funnel such that when the plunger 67 moves forward, a filter disposed within the funnel means will be compressed as it passes through the tapered portion 70 so as to reduce the outer dimension thereof. When the filter subsequently passes outwardly through the open end of the funnel means, the filter can then expand and since the normal outer dimension is greater than that of the inner dimension of the recess in the smoking article, the filter will expand and become locked within the innermost portion of the recess, thereby ensuring that the filter will be positively held in its proper operative position. It will be understood that the funnel means is subsequently removed from the recess after the filter has been disposed in operative position. It will be understood that the insertion of the filter may also be carried out either automatically by the apparatus herein disclosed, or the filter may be inserted with a manually operated tool of any suitable design such that the filter may first be compressed and inserted in position and allowed to expand within the recess provided in the smoking article.

In intermediate stations III and IV, the smoking article is illustrated as having the recess and filter means disposed within the butt end thereof. The article then passes to station IV where air passages are formed in the smoking article as illustrated by moving suitable pointed piercing members 72 inwardly at an oblique angle to the longitudinal axis of the smoking article in such a manner that the innermost portions of the air passages so formed will intersect one another adjacent the forward end of the filter disposed within the smoking article.

The piercing members 72 are formed of a hard substance such as metal or the like and are preferably pointed so as to facilitate entry into the smoking article. It is apparent that these piercing members may be either automatically operated as illustrated in the apparatus hereinafter described or they may be manually pushed into the smoking article either one at a time or simultaneously.

The smoking article is again illustrated in intermediate stations IV and V, the smoking article then being completed and having the recess with the filter disposed therewithin as well as the obliquely extending air passages 74, these various components having the interrelationship to one another as previously discussed.

It will be understood that the method as illustrated in FIG. 23 is that which is employed in making the smoking article shown in FIG. 1 of the drawings. Obviously, one or more of the steps illustrated in FIG. 23 may be eliminated in order to obtain any of the modifications shown in FIGS. 2–5 as will be apparent.

*Description of apparatus*

Referring now particularly to FIGS. 6–10, the basic supporting framework of the apparatus will be seen to comprise a base plate 80 upon which is supported a front support plate 81 and a rear support plate 82, these two plates being held in spaced relationship at the lower portions thereof by a base spacer plate 83, and the two plates also being retained in spaced relationship by a pair of frame spacers 85 and 86 and a further pair of frame spacers 87 which are disposed between the upwardly extending portions of the front and rear support plates, frame spacers 85–87 all being of circular cross section. In addition, a pair of support members 88 and 89 have the opposite ends thereof bolted or otherwise secured to the upper edge portions of plates 81 and 82, to thereby keep the plates spaced from one another and further serve an auxiliary purpose hereinafter fully described.

An article transfer means in the form of an indexing drum is indicated generally by reference numeral 100, and the construction of this indexing drum may be most clearly understood from an examination of FIGS. 9 and 10 of the drawings. This indexing drum includes a hub portion 101 which is rotatably fixed to a support shaft 102 which is journalled within ball bearings indicated generally by reference numerals 103 and 104, these ball bearings being disposed respectively within suitable openings provided in front and rear plates 81 and 82 of the framework.

The indexing drum includes a radially outwardly extending web portion 106, and it will be noted as seen in FIG. 9 that cutout portions 107 are provided at opposite sides of the web portion for lightening the weight of the drum. The indexing drum is provided with enlarged reinforced portions 110, each of which is adapted to receive and support an interchangeable removable article holding means in the form of a metallic block indicated by reference numeral 111, this block having a semi-circular cutout which receives a complementary shaped resilient pad means 112 formed of rubber or similar material, this pad means being adapted to receive and support a smoking article and to prevent damage thereto while passing through the apparatus. It will be noted that as shown in the drawings, the indexing drum is provided with eight spaced article holding means, and as will be seen particularly in FIGS. 11 and 12, each of these holding means is retained in operative position by means of a pair of bolts 115 which extend through openings provided in the holding means and into suitable threaded openings provided in the associated enlarged portion 110 of the indexing drum while the enlarged heads of the bolts fit within countersunk portions in the holding means. The interchangeability of the holding means permits different holding means to be substituted for different size smoking articles which may be employed with the apparatus.

An eight position Geneva gear 118 of conventional construction is fixed to the forward end of support shaft 102, this Geneva gear being driven by a conventional Geneva drive member indicated by reference numeral 120 which is fixed to a drive shaft 121. Geneva drive 120 is provided with a conventional roller 122 which is adapted to fit within the radial slots provided in the Geneva gear for indexing the Geneva gear through 45° increments each time the Geneva drive 120 makes a full revolution as will be well understood.

Drive shaft 121 is supported by a first ball bearing 125 supported within front plate 81 of the framework, and a second ball bearing 126 supported within a shaft support housing 128 which is bolted to the forward support plate 81. Drive shaft 121 is connected through a clutch means indicated somewhat schematically by reference numeral 129 to a gear reducer 130 mounted upon a spacer plate as seen in FIG. 7 supported on base member 80. The gear reducer is driven by a pulley 132 which is connected by means of a V-belt 133 with a driving pulley 134 driven by a driving motor 135 supported on the base plate 80.

The drive means also includes a driving sprocket 138 fixed to drive shaft 121, this driving sprocket being drivingly connected by a chain 139 with a sprocket 140 secured to the outer end of a first cam shaft 142 rotatably supported by ball bearings indicated by reference numerals 143, 144 and 257 which are respectively supported by the support plates 81, 82 and 256.

A sprocket 146 is also rotatably fixed to first cam shaft 142 and is connected by means of a chain 147 with a sprocket 148 fixed to one end of a second cam shaft 150 which is rotatably supported by ball bearings 151 and 152 supported by a shaft support housing 155 which is bolted to the side edges of support plates 81 and 82.

Feed means

Referring now to FIGS. 6 and 7 and more particularly to FIGS. 11-13, the in-feed assembly of the present invention may be more clearly understood. A feed chute 160 is supported by a support member 161 extending between front and rear plates 81 and 82, the feed chute being additionally supported by a welded frame indicated generally by reference numeral 162 and including a plate 163 supported by diagonally extending tubular members 164 and 165 interconnected by member 166, members 164 and 165 being supported by a plate 168 supported between the front and rear support plates.

A hopper 170 is positioned at the upper end of the feed chute and is adapted to receive therein a supply of smoking articles which are adapted to be fed out of the lower open end portion 171 thereof into the feed chute. It will be noted that the lower end portion 173 of the feed chute extends to a point closely adjacent to the outer surface of the indexing drum whereby smoking articles passing downwardly along the feed chute are adapted to be fed into the holding means on the indexing drum.

An agitating means includes a pair of similar agitators 174 rotatably fixed to a shaft 175 journalled between a pair of brackets 176 secured to the under surface of the feed chute. Each of agitators 174 includes an outer layer 177 formed of a resilient material such as rubber and the like, which is provided for the purpose of preventing damage to the smoking articles. Each of the agitators has a configuration as shown so as to have two peak portions 180 and 181 which are adapted to pass upwardly through a pair of openings 183 provided in the lower wall of the feed chute. A slow speed motor 185 is mounted upon the under surface of plate 163, a drive pulley 187 being drivingly connected to the motor and in turn being drivingly connected by a V-belt 188 with a driven pulley 189 rotatably fixed to shaft 175. It is apparent that during operation of the apparatus, continuous rotation of motor 185 will continuously cause the agitators 174 to rotate whereby the peak portions 180 and 181 thereof will cause the smoking articles disposed within the article to be jiggled in such a manner so that they will not tend to wedge together but will be loosened sufficiently so as to freely roll down the feed chute and maintain a steady supply of smoking articles at the lower end of the feed chute.

Disposed at the lower end of the feed chute is a single article feed means which is adapted to feed a single smoking article to the indexing drum upon each indexing motion of the drum, whereby a single smoking article is fed into each of the holding means in the indexing drum. This single article feed means includes an arm 192 which includes a first portion 193 and a second portion 194, portion 194 being pivotally supported upon a shaft 195 rotatably supported between a pair of ears 196 secured to the under surface of the feed chute. A tension spring 198 is connected between the pivoted arm and the under surface of the feed chute for normally rotating arm 192 into the position illustrated in FIG. 12.

A plate-like member 200 is secured to the upper surface of portion 194 of the pivoted arm and extends laterally to either side of the arm. The plate 200 is provided at each end thereof with a pair of spaced stop members 202 and 203 which as seen in FIG. 11 and FIG. 12 are adapted to extend upwardly within the feed chute through openings 202' and 203' respectively. It will be noted that oscillation of arm 192 about its pivot axis will cause the stop members 202 and 203 to be alternately raised and lowered within the feed chute for feeding a single smoking article at a time in accordance with the well-known escapement principle, it being apparent that the smoking articles will tend to roll down the feed chute under the influence of gravity such that there is a constant force tending to move the lowermost smoking articles toward the indexing drum.

A roller or cam follower 205 is rotatably supported at the lower end of portion 193 of the pivoted arm, this roller being normally disposed in the position shown in FIG. 12 relative to the outer surface of the indexing drum and being in such a position as to engage the cam members 206 mounted on the outer periphery of the indexing drum adjacent each of the holding means supported thereon. The arrangement is such that when the cams 206 engage rollers 205 and pivot the arm 192 into the position shown in FIG. 11, a single smoking article will be released and allowed to roll downwardly so as to be received within the holding means of the indexing drum.

The infeed portion of the apparatus as illustrated particularly in FIGS. 11 and 12 of the drawings may be considered station I of the apparatus, and corresponds roughly to station I as discussed in connection with the method previously described.

Clamping means

At stations II and III hereinafter described in detail, there is provided clamping means for firmly clamping the smoking article in place within the holding means on the indexing drum while an operation is performed on the smoking article. This clamping means resiliently holds the smoking article in place and thereby ensures that uniform results will be obtained at these stations and that the smoking article will not be damaged.

The clamping structure employed at each of stations II and III is substantially identical and accordingly the first clamping structure at station II which is the hole forming station will be described in detail. This structure can be seen most clearly in FIGS. 14 and 15 and 9.

The clamping means includes a clamping member 210 which has a substantially semi-circular recess in the lower portion thereof within which is disposed a resilient pad means 211 formed of rubber or similar material and which is designed to fit snugly about the outer surface of the smoking article so as to hold it in place and yet prevent damage thereto.

It will be apparent that clamping member 210 will cooperate with a holding means 111 and its associated resilient pad means 112 for clamping a smoking article in position. The extent of the resilient pads and members 111 and 210 is preferably such that when the holding means and clamping means are operatively positioned in clamping position, they will be spaced from one another so as to ensure that the smoking article will be firmly clamped in position.

It will be noted as seen for example in FIG. 9 that the recess in the holding means 111 is slightly greater than a semi-circular configuration while that of clamping member 210 is slightly less than a semi-circular configuration, the tapered recess provided in the holding means of the indexing drum ensuring that the supported smoking articles will be securely retained therein without the possibility of dropping out as the indexing drum rotates.

Clamping member 210 has four stripper bolts 213 associated therewith, each of these stripper bolts having the lower ends thereof threaded in suitable threaded openings provided in the clamping member. An upper clamping member support block 214 is provided, the four stripper bolts extending through suitable openings provided in member 214 with enlarged upper heads 215 of the stripper bolts fitting within countersinks provided in member 214.

A resilient compression spring 218 surrounds each of stripper bolts 213 and normally urges the clamping members 210 in a downward direction toward the adjacent indexing drum and holding means. It is apparent that upon engagement of a smoking article, clamping member 210 is adapted to move relative to member 214 as illustrated in FIG. 14 due to the interaction of the stripper bolts and spring means whereby the smoking article is resiliently clamped in operative position.

A pair of guide members 220 of similar construction are fitted within support member 89, the guide members being provided with laterally projecting annular flanges 221 at the lower ends thereof. Guide members 220 pass through suitable openings 222 provided in member 214 whereby member 214 may freely slide relative to the guide members but yet is guided in such sliding movement.

Compression springs 225 are disposed between annular flanges 221 on the guide members and the under surface of member 214 whereby member 214 is normally urged in a direction away from the indexing drum.

A common actuator for the clamping means at each of stations II and III is indicated by reference numeral 230, this common actuator having downwardly projecting portions 231 and 232 at the opposite ends thereof. A slot 235 is provided adjacent portion 231, and a pin 236 is pressed into member 214 and extends upwardly therefrom and slides within slot 235.

The clamping means at station III as mentioned previously is in all respects similar to that discussed in connection with the clamping means at station II, and accordingly, similar parts have been given the same reference primed.

It will accordingly be evident that the clamping member 210′ will cooperate with the adjacent holding means of the indexing drum to hold a smoking article in place therebetween while member 210′ is resiliently connected with member 214′ by the stripper bolts and member 214′ is urged in an upward direction by means of resilient springs 225′ as will be well understood.

A pin 236′ rides within a slot 238 provided in the common actuator 230. It is evident that springs 225, 225′ normally urge members 214, 214′ and 230 in an upward direction, and the actuator 230 will be moved downwardly against the force of such springs by means of an actuator cam 240 which is fixed to and rotates with cam shaft 142.

Recess forming means

As seen particularly in FIGS. 6, 10, 14, 15 and 19 a carriage support bracket 250 is bolted to rear support plate 82 and three spaced guide means or carriage shafts 251 are provided in the relationship as seen especially in FIG. 19. Carriage shafts 251 are suported at one end thereof by means of fittings 254 supported on rear support plates 82, the opposite ends of the carriage shafts being supported in fittings 255 supported on bracket 250. Suitable means such as set screws or the like may be provided in association with each of these fittings for holding the carriage shafts in operative position.

An upwardly extending support plate 256 is bolted to the outer surface of bracket 250, this support plate in turn supporting a bearing 257 which rotatably journals the outer end of cam shaft 142.

A reciprocable carriage 260 is provided with three ball bushings 261 each of which slides freely on one of shafts 251 whereby the carriage is freely movable along the shafts and guided in its movement thereby.

A lug 264 is fixed to the carriage and extends rearwardly thereof, this lug having a slot 265 therein which slidably receives a pin 266 which is press-fitted into one end of an actuator arm 268. Actuator arm 268 is pivoted at an intermediate point upon a pivot member 269 mounted upon a bracket 270 supported by rear support plate 82. A cam follower which may be for example in the form of a roller 272 is mounted at the opposite end of actuator arm 268, this cam follower riding within the cam track 273 of cam 275 which is secured for rotation with cam shaft 142.

Fixedly mounted on carriage 260 is a high speed drill motor 277 which drives a more or less conventional drill bit 278 which is adapted to move into the smoking article and bore out a recess at the proper depth therewithin. Carriage support bracket 250 is provided with a cutout 280 through which the drill motor 277 is adapted to extend in one limit of movement of the carriage as will be clearly evident in FIG. 15.

As seen particularly in FIGS. 15 and 20, an article end holding means is provided at station II and includes a substantially rectangular block member 282 which has a recessed portion 283 in the forward face thereof which is complementary to the configuration of one end portion of the smoking article such that the end portion of the smoking article is adapted to be snugly received within this recessed portion to hold the end portion so that when the recess is bored therein, the smoking article will not be damaged. A guide bushing 284 is fitted within a central opening in member 282 and serves to guide the drill bit 278.

Block member 282 has connected therewith a pair of similar stripper bolts 285 which are threaded at one end thereof into suitable threaded openings provided in block 282 and which extend through suitable openings provided in the carriage 260. The opposite ends of the stripper bolts are provided with enlarged heads 286 to limit outward movement of the stripper bolts, compression springs 288 being disposed in surrounding relationship to the stripper bolts between the carriage and block member 282 for normally urging the block member and the attached stripper bolts outwardly away from the carriage.

It is apparent that the stripper bolts and surrounding springs will serve to resiliently urge the block member 282 toward an associated smoking article, but will allow some amount of give so that the smoking article is not damaged. Block member 282 is adapted to pass through a rectangular cutout portion 290 provided in rear support plate 82.

*Filter inserting means*

As seen particularly in FIGS. 16–18, a filter inserting means is provided at station III, and as will be most clearly seen in FIGS. 17 and 20, an article end holding means is also provided at this station. This article end holding means is similar to that at station II and includes a substantially rectangular block member 300 which has a recess portion 301 in the forward face thereof which is complementary in shape to an end portion of a smoking article and which is adapted to snugly receive such end portion of the smoking article to prevent damage thereto while the filter is being inserted therewithin. Block 300 is adapted to move through a rectangular cutout portion 302 provided in the rear support plate 82.

A pair of similar stripper bolts 303 are threaded at one end thereof into suitable threaded openings provided in block 300 and extend through and are freely slidable within suitable openings provided in the carriage 260. The opposite ends of stripper bolts 303 are provided with enlarged heads 305 to limit outward movement of the stripper bolts and block 300. Compression springs 307 surrounding stripper bolts 303 normally urge the block 300 and the attached stripper bolts in an outward direction away from the carriage.

A funnel guide means in the form of a bushing 310 is disposed within a central opening provided in block 300, and a tubular or funnel means indicated generally by reference numeral 311 is supported on the carriage and a portion thereof is adapted to freely reciprocate through guide means 310. The funnel means includes an elongated tubular portion 313 which fits through guide means 310 and terminates in an open outer end 314 through which the filters are discharged. The funnel means includes an intermediate portion 315 which tapers inwardly toward the outer end thereof as may be clearly seen in FIGS. 16 and 17. This tapered portion serves as a compression means and the dimensions are such that when a filter is forced through the tapered portion, it will be compressed and have its lateral dimension diminished as will hereinafter be more fully explained.

A wall 318 extends upwardly and just rearwardly of this wall is defined a chamber 319 which is adapted to receive two filters at a time as shown in FIG. 17. The lowermost filter as seen in this view is disposed at the bottom of chamber 319 and a filter is disposed in overlying relationship thereto, the chamber having a width such that the filters are maintained in proper alignment therewithin.

The funnel means includes a rearwardly extending portion 321 having a bore formed therethrough within which is reciprocably disposed a plunger member 323. Forward reciprocation of this plunger member is adapted to pick up the lowermost filter in chamber 319 urging the filter forward through the tapered portion 315, thence through the tubular portion 313 and out through the open forward end 314 of the funnel means.

The rear end of plunger 323 is pivoted at 325 to the upper end of an actuator 326 which is in turn pivoted at an intermediate portion by means of a pin 327 to a bracket 328 which is secured to the lower portion of carriage 269 and moves therewith. A tension spring 330 is connected between a portion of bracket 328 and the lower end of actuator 326 for normally pivoting the actuator into the position shown in FIG. 17, wherein the plunger 323 is withdrawn into the position shown in this figure.

A solenoid 331 includes an operating arm 332 which is pivotally connected by a pin as indicated at 333 to an intermediate portion of actuator 326 such that actuation of the solenoid pulls in the operating arm 332 and pivots the actuator 326 into the position shown in FIG. 16. De-energization of the solenoid will permit the tension spring 330 to return actuator 326 to its initial position as shown in FIG. 17.

The means for feeding filters into the funnel means includes a filter feed chute 335 secured to and carried by the carriage, and this feed chute may be provided with a supply of filters as for example by connecting a hopper or similar member (not shown) to the upper end of the filter feed chute. The feed chute 335 is provided with a lateral opening 337 at the lower end thereof through which filters may be discharged to fall into chamber 319 through the open upper end thereof. A filter pusher member 340 is slidably positioned within a bushing 341 mounted within the carriage, and this pusher is adapted to pass into the lower portion of feed chute 335 and urge the lowermost filter within the feed chute outwardly such that it will then drop into chamber 319. Pusher member 340 is provided with an enlarged head 342 and a compression spring 343 is disposed between head 342 and the bottom of a recess 345 formed in the rear face of the carriage. It is evident that spring 343 will normally urge the pusher member in an outward direction.

Referring to FIG. 18, it will be seen that pusher member 340 is cut away along one side surface 347 thereof so as to form a shoulder 348 thereon which engages a set screw 349 threaded within suitable openings provided in the carriage 260 and bushing 341. It is apparent that set screw 349 will limit the movement of pusher member 340 under the influence of spring 343. As seen most clearly in FIG. 18, pusher member 340 is so positioned that upon actuation of solenoid 331, the upper forward face 350 of actuator 326 will engage the enlarged head 342 of the pusher member and urge the pusher member forwardly so that it will push the lower most filter within filter feed chute 335 out of this feed chute and into the chamber 319 within the funnel means.

At this point, a brief discussion of the manner in which the compression and expansion of the filter within the recess of the smoking article is effected is considered in order. For example, the drill bit 278 may have a diameter of ¼ inch. The normal filter diameter may be ⁵⁄₁₆ of an inch or in other words the diameter of the filter is slightly greater than the inner diameter of the hole bored within the smoking article. The outer diameter of the tubular portion 313 of the funnel means may have an outer diameter of ¼ inch so as to fit snugly within the recess formed in the smoking article, and the walls thereof may be of ½₂ inch thickness such that the inner diameter of tubular portion 313 is ³⁄₁₆ inch. It is accordingly apparent that as the filter is forced through the tapered intermediate portion 315 of the funnel means by the pusher 323, the outer dimension of the filter will be compressed from a diameter of 5/16 inch to a diameter of 3/16 inch. The filter is then forced through tubular portion 313 and outwardly through the open end 314 thereof whereupon the filter tends to expand to its normal diameter of 5/16 inch due to the inherent resilient construction of conventional filter means. As the filter then expands after leaving the funnel means, it will become wedged tightly within the recess in the smoking article since the normal outer diameter of the filter is greater than the inner diameter of the recess. This ensures that the filter will be positively retained in its proper operative position within the recess in the smoking article.

It should be noted that the dimensions used in the above paragraphs are only to illustrate the method of inserting the filter into the smoking article. The dimensions are not necessarily correct and may vary with the diameter of the smoking article and for maximum filtering action.

*Air passage forming means*

At station IV, the air passages are formed in the smoking article and for this purpose, referring to FIGS. 6, 10, 21 and 22, a housing 355 is provided, this housing being mounted upon a housing support bracket 356 which is secured to the rear support plate 82.

The housing is of a more or less spider-like configuration, and includes six outwardly projecting similar leg portions 360 each of which pivotally supports arms 361 at the outer ends thereof. Rear support plate 82 is provided with a cutout 363, the shape of which may be most clearly seen in FIG. 9 and which is generally circular except for one inwardly extending portion of the plate, this cutout permitting reciprocation of arms 361. The outer ends of each of arms 361 are provided with pins 365 which are surrounded by the curved end portions 366 of elongated piercing members 367, the inner ends of which are preferably pointed so as to facilitate piercing of the smoking article. Piercing members 367 are guided for reciprocatory movement inwardly into a central elongated opening 370 provided through housing 355 by means of bushings 371 mounted within the housing. The bushings 371 are so disposed that the piercing members 367 move inwardly at a 45° angle to the longitudinal axis of elongated opening 370 so as to form the desired oblique air passages in the finished smoking article. Each of arms 361 is normally urged outwardly by a compression spring 373 seated in a cutout portion 374 provided in the housing, the outer end of each spring bearing against an associated arm 361, and being retained in position by means of a projection 375 formed on each arm. A solenoid 377 is associated with each arm and has an operating arm 378 pivotally connected at 379 to the associated arm. It is apparent that energization of the solenoid 377 will cause the arms 361 to pivot inwardly so as to move the piercing members 367 in toward the center of opening 370 in the housing. The movement of piercing members 371 is such as to cause the piercing ends thereof to travel inwardly substantially to the longitudinal axis of the opening 370 whereby the air passages formed in the smoking article will intersect one another as shown in FIG. 22.

Shifting means for moving a smoking article into and out of the housing 355 includes a pusher shaft 382 which is mounted for reciprocation by a pair of ball bushings 383 and 384 mounted within front and rear support plates 81 and 82 respectively. A pusher member 385 is fixed to shaft 382 and is adapted to engage one end portion of a smoking article for urging the smoking article into the opening 370 in housing 355. A cross member 387 is secured to the outer end of pusher shaft 382 and a retractor shaft 388 is in turn connected with cross-member 387 such that movement of pusher member 382 back and forth will also result in a corresponding movement of the retractor shaft 388. Shaft 388 is guided for movement by a bushing 390 mounted in one end of the opening 370 in the housing, and the opposite end of retractor shaft 388 is provided with an enlarged end portion 391 adapted to engage the smoking article and move the smoking article out of the housing after the air passages have been formed in the smoking article. Movement of the retractor shaft away from housing 355 causes the end of the retractor shaft to engage the contact of a microswitch 393 for closing such microswitch. The microswitch is mounted upon a supporting bracket 394 which is in turn bolted to support bracket 356. The microswitch is connected in a conventional electrical circuit (not shown) and is connected with solenoid 331 as well as each of solenoids 377 whereby upon closing of the microswitch, each of these solenoids will be simultaneously actuated. Solenoids 377 are of a type whereby upon energization they will immediately close and then be automatically deenergized so that in this manner each of the pivoted arms 361 is returned to its outermost position immediately after the solenoids have been energized and the air passages formed in the smoking article.

The article shifting means is operated by means of a pivoted arm 396 which is supported upon a pivot member 397 supported on housing 155. A pin 398 is secured to one end of arm 396 and rides within a collar 400 fixed to pusher shaft 382. A cam follower such as a roller 402 is rotatably mounted at the opposite end of pivot arm 396, this cam follower riding within cam track 403 formed on cam 405 which is mounted on the second cam shaft 150.

*Out-Feed means*

As a smoking article is indexed from station IV to station V which is the out-feed mechanism, the smoking article is retained in the holding means by a guard rail 408, FIG. 9, which is attached to the front support plate 81. This guard rail has an arcuate surface which will prevent the smoking article from dropping out of the holding means until the holding means reaches a point adjacent the upper end portion 410 of an outlet chute indicated generally by reference numeral 411. When the holding means reaches the position adjacent the outlet chute as seen for example in FIG. 9, the smoking article will roll out of the outlet means under the influence of gravity and drop down upon the outlet chute from whence it may be fed to any suitable mechanism. The outlet chute is supported by a pair of transverse support members 412 and 413 which have their opposite ends secured to the front and rear support plates 81 and 82 respectively.

*Operation*

The apparatus is adapted to be continuously operated such that the operation thereof will be fully automatic and the smoking articles can be produced in quantity. The motor 135 will be continuously driven and through the gear reducer 130 will continuously drive the Geneva drive member 120 which will in turn cause the Geneva gear and the indexing drum to be indexed to 45° increments in a well-understood manner. At the same time the two cam shafts 142 and 150 will be continuously rotating through the intermediary of the chain drives 139 and 147.

The feed mechanism will continuously supply smoking articles down the feed chute to the single article feed mechanism at the lower end of the chute. As indicated in FIG. 11, as the indexing drum is indexed in a counter clockwise direction as seen in this figure, a cam member 206 will engage roller 205 so as to pivot arm 192 and thereby release a single smoking article which will then be received within the recess in the holding means 111. After such indexing movement of the indexing drum, the drum will come to rest and remain in stationary condition until the Geneva drive again engages a slot in the Geneva gear for a subsequent indexing movement. During this stationary period of the indexing drum, the operations are performed on the smoking articles. As the indexing drum comes to rest, cam 240 will move the clamping means actuator 230 down to cause the clamping means at stations II and III to firmly clamp the smoking article in place on the indexing drum.

Cam 275 is at the same time moving carriage 260 in a forward direction whereupon the article end holding means 282 at station II and 300 at station III engage the ends of the smoking articles at these stations, assuming that a smoking article is present at each station. If no smoking article is present at one particular station, it is apparent that no operation will take place at that station.

The article end holding blocks 282 and 300 after firmly receiving the associated ends of the smoking articles will then be held in position and the carriage will move with respect to these holding blocks by compressing the springs surrounding the associated stripper bolts.

The carriage will continue to move forward such that the drill bit 278 will move into a smoking article forming the desired recess within the smoking article at station II while the funnel means moves into the recess which has previously been formed in the smoking article and which is now at station III.

Simultaneously with movement of the carriage inwardly under the influence of cam 275, cam 405 through the intermediary of pivoted arm 396 is moving the article shifting means such that a smoking article at station IV is moved into housing 355 of the air passage forming mechanism. As the shifting means reaches its limit of movement, the end portion of retractor shaft 388 engages microswitch 393. Closing of microswitch 393 causes energization of solenoid 331 and each of solenoids 377. Energization of solenoid 331 causes the plunger 323 to be moved from the position shown in FIG. 17 to the position shown in FIG. 16, thereby inserting the filter within the bottom of the recess formed in the smoking article. Energization of solenoids 377 causes each of the pivoted arms 361 to move inwardly thereby carrying the piercing members 367 inwardly so as to form the air passages in the smoking article which is in the position shown in FIG. 22 at such time. It will be seen that the piercing members 367 move inwardly so as to form passages in the smoking article which intersect with one another adjacent the forward end of the filter which has been previously inserted in the recess formed in the smoking article.

At this point in the operation of the apparatus, the mechanisms are in the positions shown in FIGS. 14, 16 and 22. It will be noted that cams 275 and 405 are designed to have a slight dwell when the mechanisms of the apparatus are in their innermost positions as shown in FIGS. 14, 16 and 22. While these mechanisms are in this dwell position, the solenoids 331 as well as solenoid 377 will release. As solenoid 331 releases, spring 330 will pivot actuator 326 back to the position shown in FIG. 17 allowing two filters to be dropped down into the position shown in FIG. 17. It is apparent that inward movement of the actuator 326 as shown in FIG. 16 through the intermediary of pusher member 340 had already fed an additional filter into chamber 319. In this manner, there will always be two filters within chamber 319 such that the lowermost one can upon each cycle of operation be fed into a smoking article.

While the components are in the aforementioned dwell position, solenoids 377 will also release thereby permitting springs 373 to retract the piercing members 367. Continued rotation of cams 275 and 405 will produce retraction of the carriage and the article shifting means respectively. As the carriage moves away from the indexing drum, the drill bit is withdrawn from the smoking article at station II and the tubular funnel means 311 is withdrawn from the smoking article at station III. At the same time, retraction of the article shifting means causes retractor shaft 388 to move the completed smoking article back to the position shown in FIG. 21 such that it is again disposed within the holding means in the indexing drum.

The components then arrive at a point where cams 275 and 405 provide a longer dwell and during this dwell period the Geneva drive again picks up the Geneva gear and indexes the mechanism another 45°.

A complete cycle of operation as described above will obviously be repeated over and over again whereby a smoking article will be continuously moved through the apparatus from the in-feed means to the out-feed means thereof. As mentioned previously, it is apparent that one or more of the mechanisms at stations II, III or IV may be eliminated in processing a smoking article, and accordingly, for example, the drill bit 278 could be removed at station II so that no recess would be formed in the smoking article, or the funnel 311 could be removed at station III and solenoid 331 disconnected so that the plunger mechanism would become idle, and further at station IV the solenoid 377 could be disconnected so as not to form any air passages in a smoking article. It is additionally apparent that the operations at the different stations could be further disconnected by disconnecting the actuator arms 268 or 396 so as to render shifting of the carriage or shifting of the article shifting means inoperative.

It is apparent from the foregoing that there is provided a new and novel method and apparatus for making smoking articles and a new and improved smoking article product is obtained which provides a cooler and more pleasant smoke. A method and apparatus is disclosed which can be carried out automatically and which permits various operations to be performed on a smoking article either separately or in different combinations. The apparatus incorporates new and novel means for forming a recess in a butt end of a smoking article for inserting a filter in a recess in a smoking article, and further for forming air passage means in a smoking article. The apparatus of the present invention is relatively simple, compact and inexpensive in construction and yet is efficient and reliable in operation. The method of the present invention may be carried out either completely automatically or the various individual steps of the method can be carried out manually as will be apparent. The novel method of the present invention is particularly advantageous in that it reduces the concept of manufacturing the smoking article of the present invention to a minimum.

As this invention may be embodied in several forms without departing from the spirit or essential characteristics thereof, the present embodiment is therefore illustative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Apparatus for making smoking articles comprising article transfer means for transferring smoking articles from one position to another, feed means for feeding at least partially manufactured smoking articles to said article transfer means, air passage forming means for forming air passage means in each smoking article, said air passage means comprising a housing having an opening for receiving a smoking article, piercing means movably supported by said housing for piercing said smoking article and thereby forming said air passage means, article shifting means for moving a smoking article into and out of said housing, solenoid means operatively connected with said piercing members for causing actuation thereof, and switch means engaged by a portion of said article shifting means for operating said solenoid means in timed relationship to the movement of a smoking article.

2. Apparatus for making smoking articles comprising a supporting framework, article transfer means movably supported by said framework and adapted to transfer smoking articles from one position to another in said apparatus, drive means drivingly connected with said article transfer means for moving said article transfer means, feed means for feeding at least partially completed smoking articles to said article transfer means, recess forming means for forming a recess in one end portion of each of said smoking articles, air passage forming means for forming air passages in a smoking article and including a housing supported by said framework, said housing having an opening therein for receiving a smoking article, a plurality of pointed piercing members reciprocably supported within said housing and movable into the opening in the housing obliquely to the longitudinal axis of said opening so as to form air passages in a smoking article disposed within said opening with the air passages in the smoking article extending obliquely to the longitudinal axis of the smoking article, means normally urging each of said piercing members away from said opening in the housing, means for selectively urging said piercing members inwardly for forming said passages, article shifting means for moving a smoking article into and out of said opening in the housing, and cam means for moving said article shifting means in timed relationship to the movement of said article transfer means.

3. Apparatus for making smoking articles comprising a supporting framework, article transfer means movably supported by said framework and adapted to transfer smoking articles from one position to another in said apparatus, drive means drivingly connected with said article transfer means for moving said article transfer means, feed means for feeding at least partially completed smoking articles to said article transfer means, recess forming means for forming a recess in one end portion of each of said smoking articles, filter inserting means including a hollow funnel means having an open outer end, said funnel means including an intermediate portion which tapers inwardly toward said outer end, means for feeding filters into said filter inserting means, means for forcing filters through said intermediate portion of said funnel means for compressing the filters and for moving the filters out of the open end of the funnel means so as to be disposed within the recess within said smoking article, a carriage reciprocably supported by said framework, said recess forming means and said filter inserting means being carried by said carriage for movement toward and away from said article transfer means, a pair of article end holding means each being movably supported by said carriage, resilient means normally urging said article end holding means away from said carriage, and air passage forming means for forming air passage means in each smoking article, said air passage forming means comprising a support housing having an opening for receiving said smoking article, piercing means movably supported by said housing for movement into and out of said opening and being mounted for movement obliquely to the logitudinal axis of the smoking article, and article shifting means for moving said smoking article into and out of said opening in the housing.

4. Appartus as defined in claim 3, wherein said drive means includes means for intermittently indexing said article transfer means so as to move smoking articles supported thereon periodically from one position to another in the apparatus.

5. Apparatus as defined in claim 3, wherein said feed means includes a chute for directing smoking articles to a point adjacent said article transfer means, said feed means including a pivotally supported arm having a pair of spaced stop members therein such that pivotal movement of said arm will serve to feed one smoking article at a time onto said article transfer means, resilient means normally urging said arm in one direction of movement, and means on said article transfer means for causing movement of said arm in an opposite direction.

6. Apparatus as defined in claim 3, including clamping means for clamping smoking articles in place on said article transfer means while a recess is being formed in a smoking article and while a filter is being inserted in a smoking article, said clamping means including an actuator means, a pair of upper clamping member supports, means guiding the movement of said upper clamping member supports and means normally urging said supports in a direction away from said article transfer means, said clamping means also including a clamping member supported by and movable with respect to each of said upper clamping member supports, and means normally urging each of said clamping members toward said article transfer means.

7. In appartus for making smoking articles, air passage forming means comprising a housing having an elongated opening therein for receiving a smoking article, a plurality of pointed piercing members reciprocably supported by said housing for movement along axes extending obliquely to the longitudinal axis of said elongated opening, a pivoted arm operatively connected with each of said piercing members for reciprocating the piercing members, resilient means normally urging each of said arms in one direction, means for moving each of said arms in the opposite direction against the force of said resilient means, shifting means for moving a smoking article into and out of the opening within said housing, said shifting means including a first portion for engaging one end of a smoking article and a second portion for engaging the opposite end of a smoking article, and means for moving said shifting means to thereby shift a smoking article into and out of operative position relative to said housing and said piercing members.

8. In apparatus for making smoking articles, filter inserting means comprising hollow funnel means having an outer open end portion adapted to fit within a recess in a smoking article, said funnel means including an intermediate portion which tapers inwardly toward said outer end portion, said funnel means having an opening for receiving filters therein, plunger means mounted for sliding movement within said funnel means and adapted to engage a filter and force such filter through said tapering intermediate portion to compress the filter and then forcing the filter out through the open outer end of the funnel means, means for feeding additional filters into said funnel means, said filter inserting means being carried by a reciprocable carriage, article end holding means including a portion for snugly receiving the end of a smoking article, stripper bolts connected to said article end holding means, said stripper bolts being freely slidably supported by said carriage, means for limiting movement of said stripper bolts in one direction with respect to said carriage, resilient means normally uring said article end holding means in one direction with respect to said carriage, said article end holding means including a portion for receiving and guiding movement of the outer end portion of said funnel means.

9. Apparatus for making smoking articles comprising a supporting framework, article transfer means movably supported by said framework and adapted to transfer smoking articles from one position to another in said apparatus, drive means drivingly connected with said article transfer means for moving said article transfer means, feed means for feeding at least partially completed smoking articles to said article transfer means, recess forming means for forming a recess in one end portion of each of said smoking articles, means for firmly holding said one end of each smoking article in position while the recess is being formed therein, and filter inserting means including a hollow funnel means having an open outer end, said funnel means having an intermediate portion tapering inwardly toward said hollow outer end, means for feeding filters into said funnel means, means for forcing filters through said tapering portion of the funnel means and out of the open outer end thereof into said recess in said smoking article, a carriage reciprocably supported by said framework, said recess forming means and said filter inserting means being supported and carried by said carriage for movement toward and away from said article transfer means, and clamping means including a pair of clamping members, each of said clamping members being adapted to clamp a smoking article in place on said article transfer means, a pair of upper clamping member supports, each of said clamping members being operatively connected with one of said clamping member supports by means of stripper bolts, resilient means normally urging said clamping members toward said article transfer means, and actuator means for moving said clamping member supports toward said article transfer means, and including guide means supported by said framework for guiding the movement of said upper clamping member supports, and resilient means normally urging said clamping member supports away from said article transfer means.

References Cited by the Examiner

UNITED STATES PATENTS

| | | | |
|---|---|---|---|
| 306,518 | 10/84 | Pokorny | 131—10 |
| 1,752,340 | 4/30 | Hohn | 131—94 X |
| 1,967,610 | 7/34 | Edwards | 131—94 |
| 1,996,962 | 4/35 | Hoke et al. | 131—94 |
| 2,244,142 | 6/41 | Clausen | 131—254 X |
| 2,277,686 | 3/42 | Blount | 131—254 |
| 2,331,506 | 10/43 | Redford et al. | 131—254 |
| 2,754,830 | 7/56 | Noecker et al. | 131—254 |
| 2,800,133 | 7/57 | Sundberg | 131—254 |
| 2,929,384 | 3/60 | Eissmann | 131—94 |
| 3,043,314 | 7/62 | Bartolomeo | 131—10 X |

FOREIGN PATENTS

| | | |
|---|---|---|
| 160,356 | 4/41 | Austria. |
| 189,104 | 8/07 | Germany. |
| 352,082 | 7/31 | Great Britain. |
| 521,607 | 5/40 | Great Britain. |

SAMUEL KOREN, *Primary Examiner.*